United States Patent
Singh (10) Patent No.: US 8,052,356 B2
(45) Date of Patent: Nov. 8, 2011

(54) HOLE SAW SYSTEM WITH IMPROVED SLUG REMOVABILITY

(75) Inventor: Satnam Singh, Kitchener (CA)

(73) Assignee: Team Fair Holdings Limited, Road Town, Tortola (VG)

(*) Notice: Subject to any disclaimer, the term of this patent is extended or adjusted under 35 U.S.C. 154(b) by 567 days.

(21) Appl. No.: 12/184,569

(22) Filed: Aug. 1, 2008

(65) Prior Publication Data

US 2009/0035082 A1 Feb. 5, 2009

Related U.S. Application Data (60) Provisional application No. 60/953,221, filed on Aug. 1, 2007.

(51) Int. Cl.
*B23B 47/34* (2006.01)
*B25B 7/00* (2006.01)

(52) U.S. Cl. ............... 408/67; 408/204; 408/241 R (58) Field of Classification Search ............ 408/67, 408/68, 204–206, 241 R, 703; 81/3.41; 294/99.2; B23B 47/34, 7/00
See application file for complete search history.

(56) References Cited

U.S. PATENT DOCUMENTS

| | | | | |
|---|---|---|---|---|
| 2,473,077 A | * | 6/1949 | Starbuck, Jr. | 408/206 |
| 2,779,361 A | * | 1/1957 | McKiff | 408/204 |
| 4,072,441 A | * | 2/1978 | LaPointe | 408/204 |
| 4,279,551 A | | 7/1981 | Wilterding | |
| 4,652,185 A | * | 3/1987 | Malrick | 408/68 |
| 4,755,087 A | | 7/1988 | Parent | |
| 4,760,643 A | * | 8/1988 | Juma | 408/206 |
| 4,968,101 A | * | 11/1990 | Bossow | 299/41.1 |
| 5,007,777 A | * | 4/1991 | Itokazu | 408/67 |
| 5,082,403 A | * | 1/1992 | Sutton et al. | 408/68 |
| 5,597,274 A | | 1/1997 | Behner | |
| 5,803,677 A | * | 9/1998 | Brutscher et al. | 408/204 |
| 5,904,454 A | | 5/1999 | Washer | |
| 6,357,973 B2 | * | 3/2002 | Chao | 408/204 |
| 6,588,992 B2 | * | 7/2003 | Rudolph | 408/204 |
| 6,599,063 B1 | | 7/2003 | Capstran | |
| D478,339 S | * | 8/2003 | Morton et al. | D15/139 |
| 6,705,807 B1 | | 3/2004 | Rudolph et al. | |
| 6,893,194 B2 | * | 5/2005 | Jones et al. | 408/204 |
| 6,948,574 B2 | * | 9/2005 | Cramer et al. | 175/403 |

(Continued)

FOREIGN PATENT DOCUMENTS

EP 612575 A1 * 8/1994

(Continued)

OTHER PUBLICATIONS

International Searching Authority/Canadian Intellectual Property Office, International Search Report dated Oct. 22, 2008, 7 pages, PCT/CA2008/001419.

*Primary Examiner* — Eric A Gates
(74) *Attorney, Agent, or Firm* — Miller Thomson LLP; R. Craig Armstrong (57) ABSTRACT

There is provided a hole saw system comprising a hole saw including a bottom portion and a body portion; a mandrel, including apparatus for receiving the hole saw; wherein the hole saw includes a plurality of slot pairs, the slot pairs being offset from each other on the body portion allowing a tool to be inserted into one of the slot pairs for removal of a slug.

12 Claims, 10 Drawing Sheets

U.S. PATENT DOCUMENTS

| | | | | |
|---|---|---|---|---|
| D516,594 S * | 3/2006 | Morton | | D15/139 |
| 7,101,124 B2 * | 9/2006 | Keightley | | 408/204 |
| 7,556,459 B2 * | 7/2009 | Rompel | | 408/204 |
| 7,621,703 B2 * | 11/2009 | Keightley | | 408/204 |
| 7,637,703 B2 * | 12/2009 | Khangar et al. | | 408/204 |
| 7,658,576 B1 * | 2/2010 | Buzdum et al. | | 408/204 |
| 7,661,913 B2 * | 2/2010 | Nordlin | | 408/202 |
| 7,674,078 B1 * | 3/2010 | Buzdum et al. | | 408/1 R |
| 2004/0042861 A1 * | 3/2004 | Capstran | | 409/132 |
| 2005/0214086 A1 * | 9/2005 | Nicholas | | 408/204 |
| 2007/0036620 A1 * | 2/2007 | Keightley | | 408/204 |
| 2010/0034608 A1 * | 2/2010 | Nordlin et al. | | 408/207 |
| 2010/0047030 A1 * | 2/2010 | Eiserer et al. | | 408/204 |
| 2010/0067995 A1 * | 3/2010 | Keightley | | 408/68 |

FOREIGN PATENT DOCUMENTS

JP  05318217 A  * 12/1993

* cited by examiner

HOLE SAW SYSTEM WITH IMPROVED SLUG REMOVABILITY

CROSS REFERENCE TO RELATED APPLICATIONS

This application claims the benefit of priority of U.S. Provisional Patent Application No. 60/953,221 filed Aug. 1, 2007, which is incorporated herein by reference in its entirety.

FIELD OF THE INVENTION

The present invention relates generally to hole saws. More particularly, the present invention relates to a hole saw system with improved slug removability.

BACKGROUND OF THE INVENTION

In prior art hole saw systems, there are several inherent issues with respect to slug ejection, excessively heavy hole saws and/or particulate ejection. Many of these prior art hole saw systems suffer from more than one of these problems.

For instance, with respect to slug ejection, after a hole has been cut by a hole saw, the slug remains in the saw and often is difficult to remove. In current solutions, the user must "pop" the slug out by inserting a tool into the hole saw and then pushing, or prying, the slug out.

Furthermore, current hole saws tend to be quite heavy, particularly those of bi-metal because of the construction method (i.e. thick steel plate backing). The weight of a hole saw typically increases power usage requirements which is not ideal especially for battery-operated drills, since the battery runs low too quickly. Therefore, heavier prior art hole saws are more costly to use as batteries are drained in a faster time frame. Even if a user was using rechargeable batteries, there is a consistent need to change batteries in the midst of jobs and/or projects which is time consuming and affects overall work productivity and flow.

For other hole saws which have a solid bottom portion, there are particulates which accumulate as the hole saw is cutting the hole, such as wood particles. These particulates collect in the bottom of the hole saw which can result in further work delays as the user must clean the hole saw to remove these particulates prior to further use.

Also, there are some hole saw systems with ejection apparatus integrated to the hole saw assembly to improve slug ejection, however, these mechanisms require extra components and are costly and complex.

It is, therefore, desirable to provide a hole saw system which overcomes at least one of the above-identified disadvantages of the prior art.

SUMMARY OF THE INVENTION

It is an object of the present invention to obviate or mitigate at least one disadvantage of previous hole saw and/or hole saw systems. The hole saw system of the invention provides an improved method of facilitating slug removal from the hole saw. Other aspects of the invention include reducing the overall hole saw weight and facilitating the ease of slug particulate, or swarf, removal.

In a further embodiment, the hole saw system includes a slug removal tool, or slug puller.

In a first aspect, the present invention provides a hole saw system comprising a hole saw including a bottom portion and a body portion; and a mandrel, including apparatus for receiving the hole saw; wherein the hole saw includes at least one slot pair for receiving a tool to be inserted into the slot pair for removal of a slug; and wherein the at least one slot pair provides access to the slug over a longer longitudinal distance.

In a further embodiment, there is provided a hole saw, having longitudinal side access slots to facilitate slug removal, including at least one pair of opposing slots positioned closer to a proximal end of the hole saw, and at least one pair positioned closer to a distal end of the hole saw, for access over a larger longitudinal distance than if aligned with each other.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 2b is a top perspective view of the hole saw and mandrel combination of FIG. 2a;

FIG. 5b is a front view of the slug removal tool of FIG. 5a;

FIG. 7b is a perspective view of FIG. 7a;

DETAILED DESCRIPTION

Generally, the present invention provides a hole saw system which includes an improved hole saw. The hole saw also includes means for improving slug removal, as will be described in more detail below. In one embodiment, the pilot bit being used in the current system has a longer flute section than current standard drill bits to improve both slug and particulate matter removal. In a further embodiment, the hole saw system also includes a slug removal tool for improving slug removability.

Figure 1A:
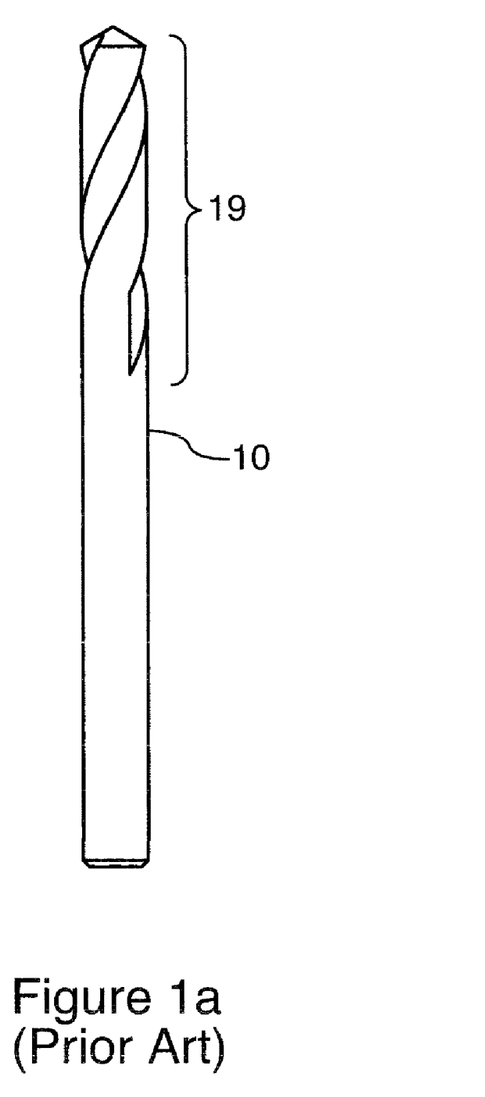
FIG. 1a is a side view of a prior art pilot bit.
Figure 1B:
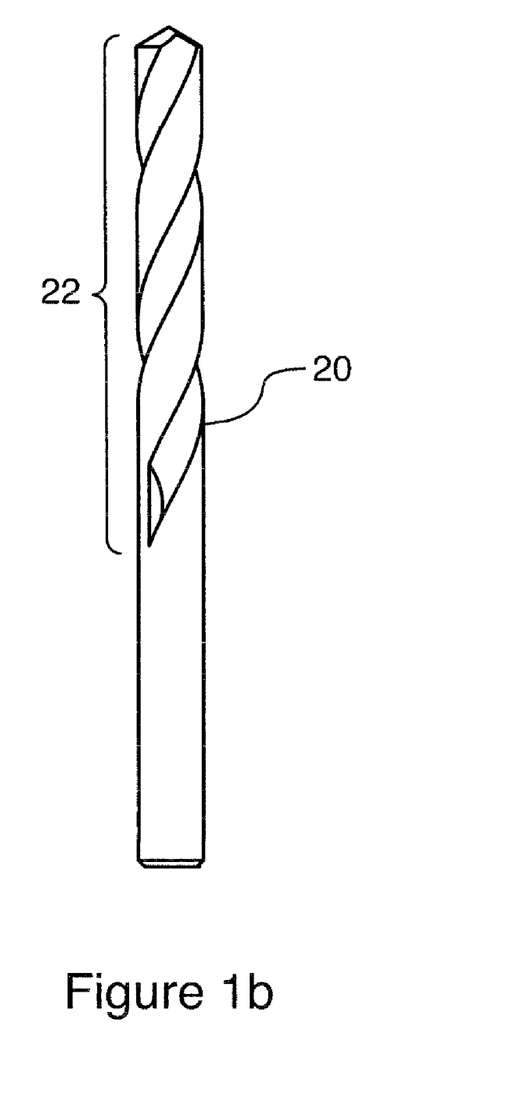
FIG. 1b is a side view of a pilot bit for use with the hole saw system of the present invention.

FIGS. 1a and 1b illustrate one feature of the current invention. As shown, FIG. 1a is a prior art pilot bit 10 while FIG. 1b is a pilot bit 20 for use with the hole saw system. The pilot bit 20 includes an extended flute section 22 (extended with respect to the flute section 12 of the prior art pilot bit 10). The extended flute section 22 provides improved material, or particulate, removal as the pilot bit advances and the hole is being cut as the cut material travels more readily into the "bell" area of the hole saw, instead of creating resistance to further advancement of the pilot bit into the material and resistance to removing the slug due to clogging. The extended flute section 22 provides an improved debris removal channel for deeper depth cuts. The drawback of the current art is that when the hole saw system is used for deeper cuts, the shorter flute section 12 does not reach the proximal surface of the slug. This results in a trapping of the debris between the slug and the pilot bit thereby increasing the likelihood of the slug jamming on the pilot bit making slug removal more difficult.

Figure 2A:
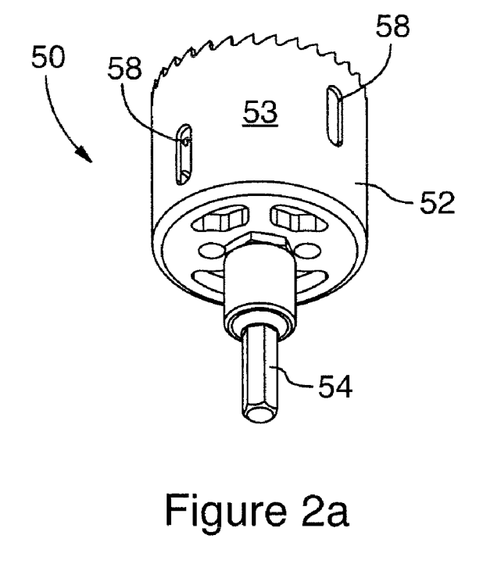
FIG. 2a is a bottom perspective view of a hole saw and mandrel combination.
Figure 2B:
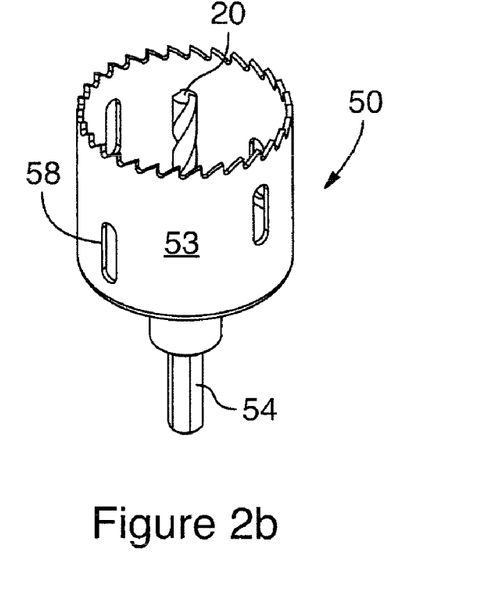
Figure 2C:
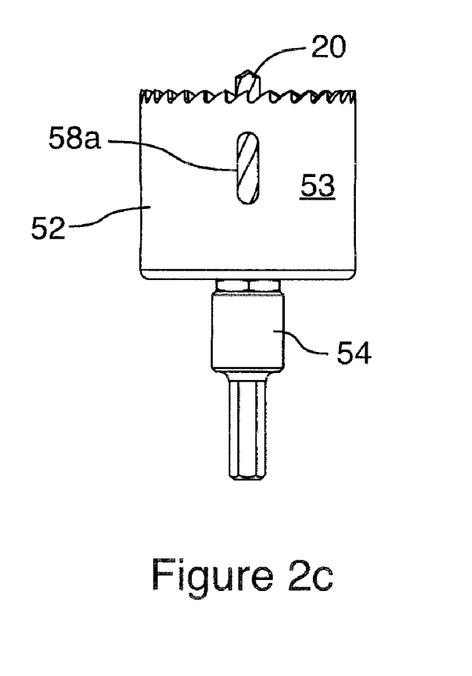
FIG. 2c is a side view of the hole saw and mandrel combination.
Figure 2D:
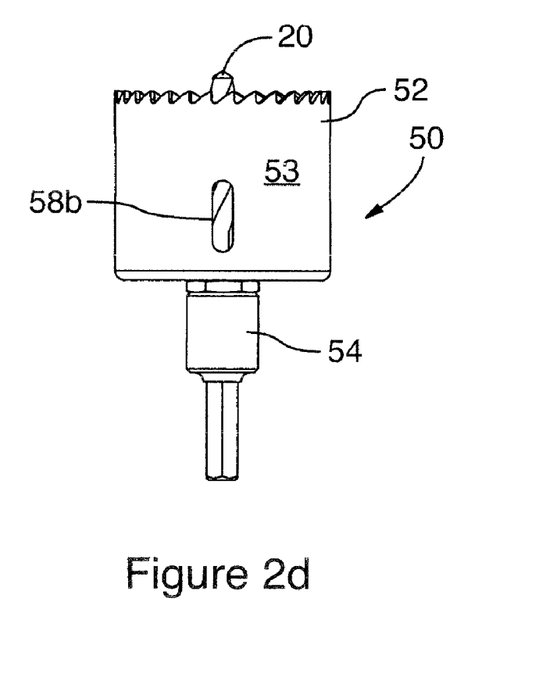
FIG. 2d is a second side of the hole saw and mandrel combination, taken 90 degrees from FIG. 2c.
Figure 4:
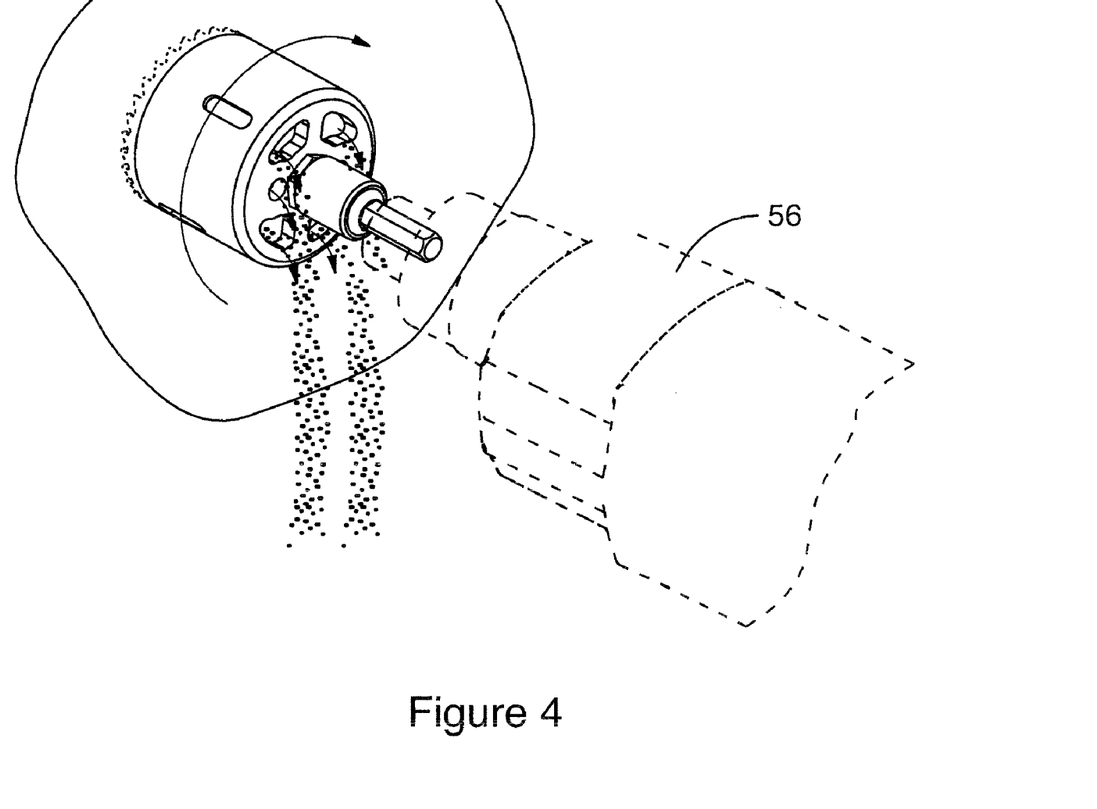
FIG. 4 is a perspective view of the hole saw and mandrel combination connected to a drill.

Turning to FIGS. 2a to 2d, various views of a hole saw and mandrel combination are provided. FIG. 2a is a bottom perspective view, FIG. 2b is a top perspective view and FIGS. 2c and 2d are side views of the combination. The combination 50 includes a hole saw 52, having a body 53 and a bottom 70, which is connected to a mandrel 54 in a known manner such as by a threaded connection. Other methods of connecting the hole saw 52 to the mandrel 54 will be understood by one skilled in the art. Prior to operation, the mandrel 54 is inserted into a drill 56 (such as shown in FIG. 4).

Figures 2E, 2F, 2G:
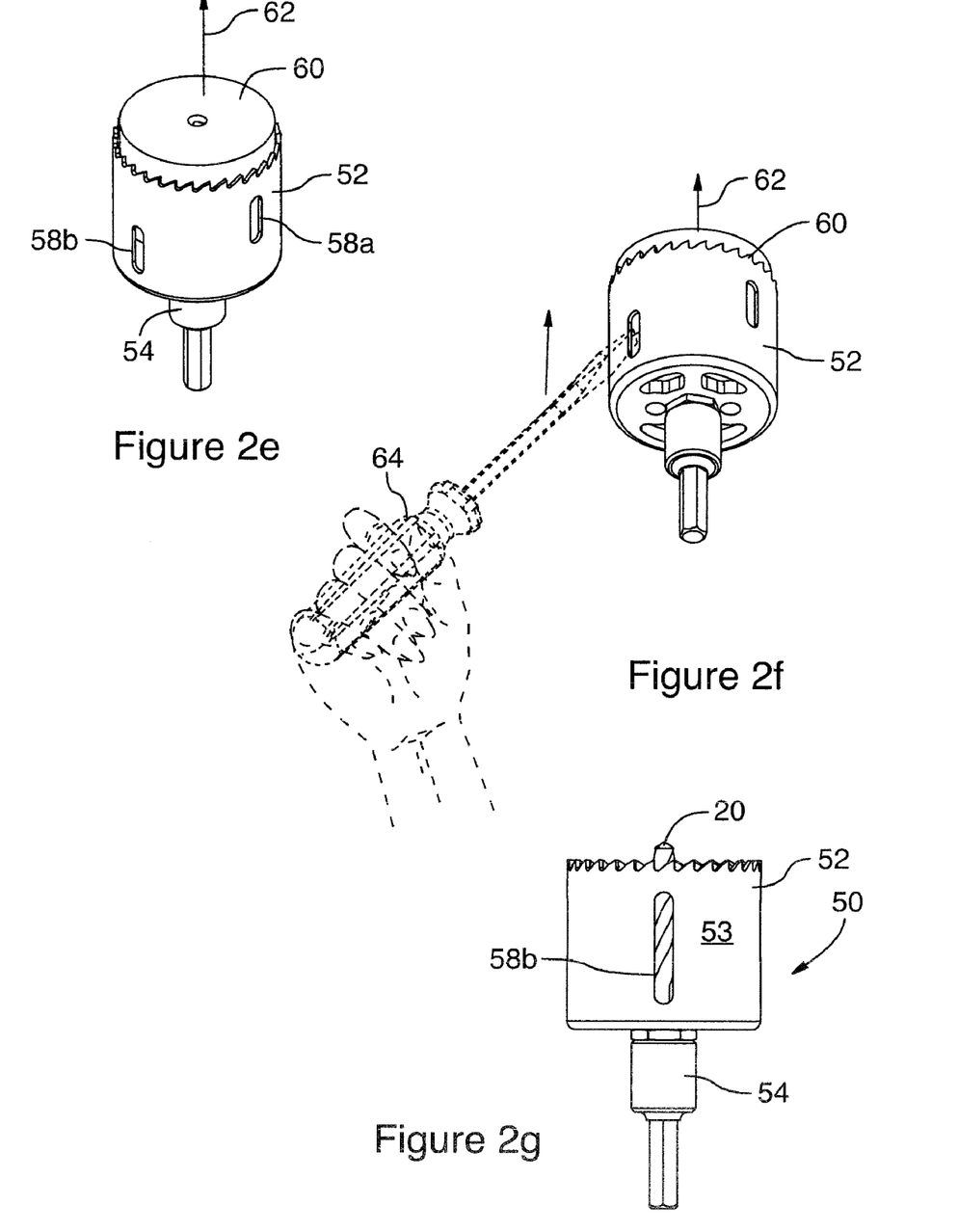
FIG. 2e is a top perspective view of the hole saw and mandrel combination with a slug in the hole saw.
FIG. 2f is a perspective view of the hole saw and mandrel combination with the slug being removed.
FIG. 2g is a perspective view of another embodiment of a hole saw and mandrel combination.

As can be seen in FIGS. 2a and 2b, the hole saw 52 includes a plurality of slots 58 (seen as slot 58a and slot 58b) which are offset from each other. Identical slots are located diametrically across from these slots so that an apparatus for removing a slug can be inserted into the hole saw to assist in slug removal. This will be described in more detail with respect to FIGS. 2e and 2f. By having a plurality of offset access points, the slug can be removed from the hole saw 52 at any point during the full cycle of the hole cutting process. As shown in the embodiment of FIG. 2g, a single slot pair can be provided in the hole saw body which extends over most of the hole saw body to provide access to the slug no matter where the slug is located within the hole saw. This is especially beneficial for deeper slugs whereby standard holes saws provide limited access.

In the preferred embodiment, there are two pairs of slots 58 which are 90 degrees from each other, with two opposing (diametrically opposite) ones positioned closer to the proximal end of the hole saw and the other two positioned closer to the distal end of the hole saw, for access over a larger longitudinal distance of the hole saw body 53 than if aligned with each other. More generally, in the preferred embodiment, there are at least one pair of opposing slots positioned closer to the proximate end of the hole saw, and at least one pair positioned closer to the distal end of the hole saw. In addition to providing improved access for slug removal, the offset of the slots provides better strength than if they were aligned with each other.

Turning to FIG. 2e, a perspective view of the hole saw combination 50 is shown with a slug 60 located within the hole saw 56. In order to remove the slug 60, the slug 60 must be urged out of the hole saw in the direction of arrow 62. In one embodiment, as shown in FIG. 2f, the slug 60 can be urged out of the hole saw 52 by inserting a tool, such as screwdriver 64, into one of the slots 58b and then prying the slug 60 out of the hole saw 52. By combining the hole saw with the pilot bit 20 having the extended flute section 22, the pilot bit 20 assists in reducing or eliminating the amount of prying needed to remove the slug. Depending on the location of the bottom of the slug 60, the tool can also be inserted into the other slot 58a. As indicated above, the offset slots allows for access to the slug 60 over a longer longitudinal distance. Alternatively, the slug 60 can also be removed by a slug removal tool, or puller, such as the one described below. If the slug 60 is completely within the hole saw, the slug 60 can be pushed out via one of the slots in the bottom of the hole saw 62.

Figure 3A:
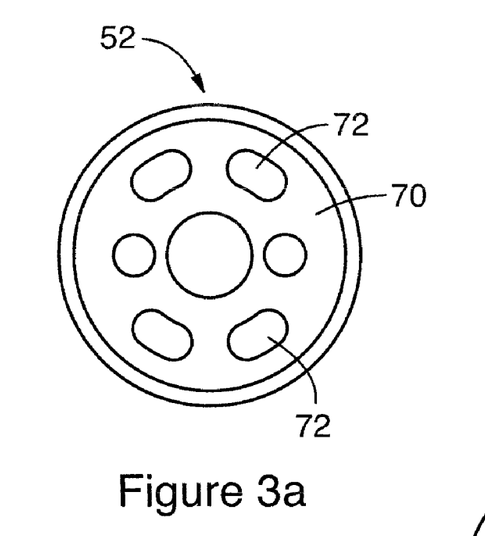
FIG. 3a is a bottom view of a hole saw.
Figure 3B:
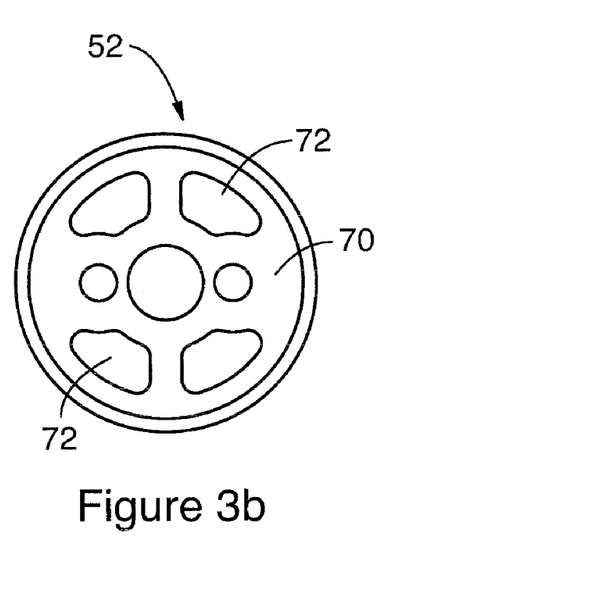
FIG. 3b is a bottom view of another embodiment of a hole saw.
Figure 3C:
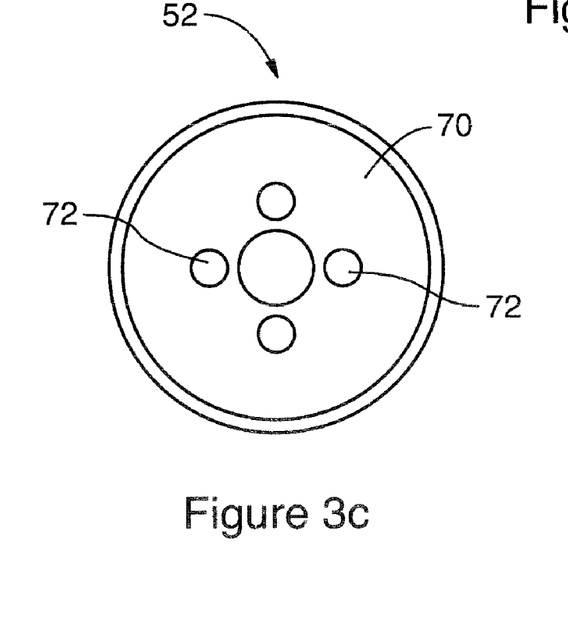
FIG. 3c is a bottom view of a further embodiment of a hole saw.

Turning to FIGS. 3a to 3c, various views of different embodiments of a hole saw are shown. As shown, the bottom 70 of the hole saw 52 includes a plurality of weight reduction slots 72 which allow the hole saw 52 in the hole saw system to be lighter than various prior art hole saws. These slots 72 can also be used to assist in slug removal by providing further locations for the user to access the slug 60, such as briefly discussed above. For instance, a user can insert a tool into one of the weight reduction slots 72 and urge the slug 60 out of the hole saw 52 by pushing the tool into the hole saw 52. The rear slots 72 also allow for debris, which can be collected during the hole making process, to exit through the rear of the hole saw. This is schematically shown in FIG. 4. In this manner, there is no need to clean the hole saw and work flow is continuous. In some embodiments, these slots 72 include holes which receive drive pins for mandrels having such pins.

As will be understood, the locations and size of the weight reduction slots 72 is determined by the manufacturer and is not held to a specific design. The configurations can be determined based on the size of the hole saw but are determined based on the priority that adequate strength is maintained in the hole saw. In other embodiments, the selection of the weight reduction slot locations and/or configurations can also be determined and/or matched to hole saw diameter and overall weight balance of the hole saw. The slot locations of the current invention, both the slots 58 and the weight reduction slots 72, provide an improvement in that there is access to the slug over more than 50% of the hole saw body. Prior art hole saws have slots providing access covering less than half of the hole saw body.

Figure 5A:
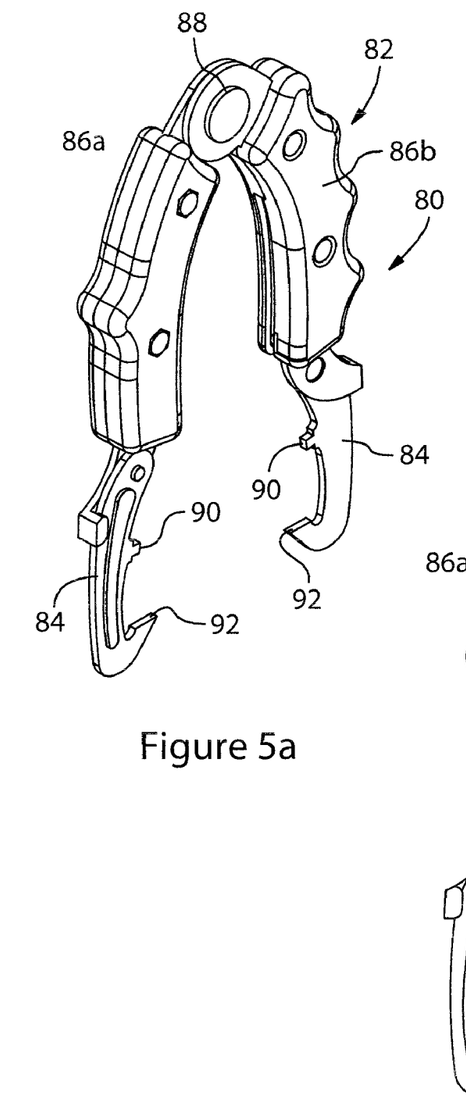
FIG. 5a is a perspective view of a slug removal tool in an open, or in use, position.
Figure 5B:
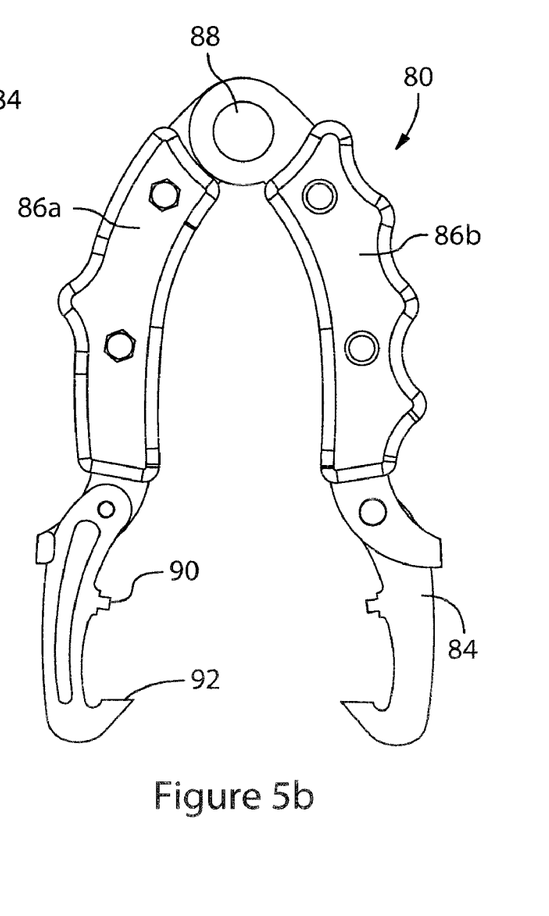
Figure 5C:
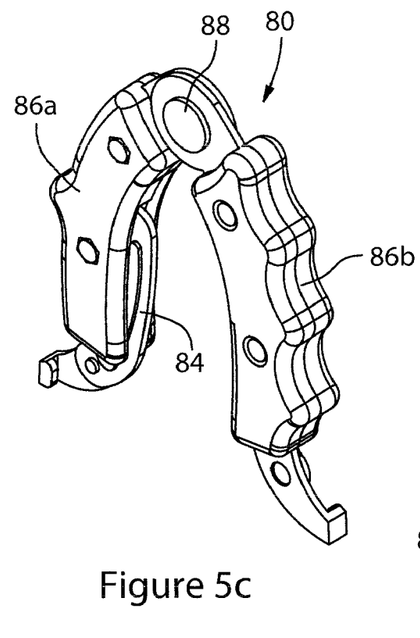
FIG. 5c is a perspective view of the slug removal tool of FIG. 5a in a closed position.
Figure 5D:
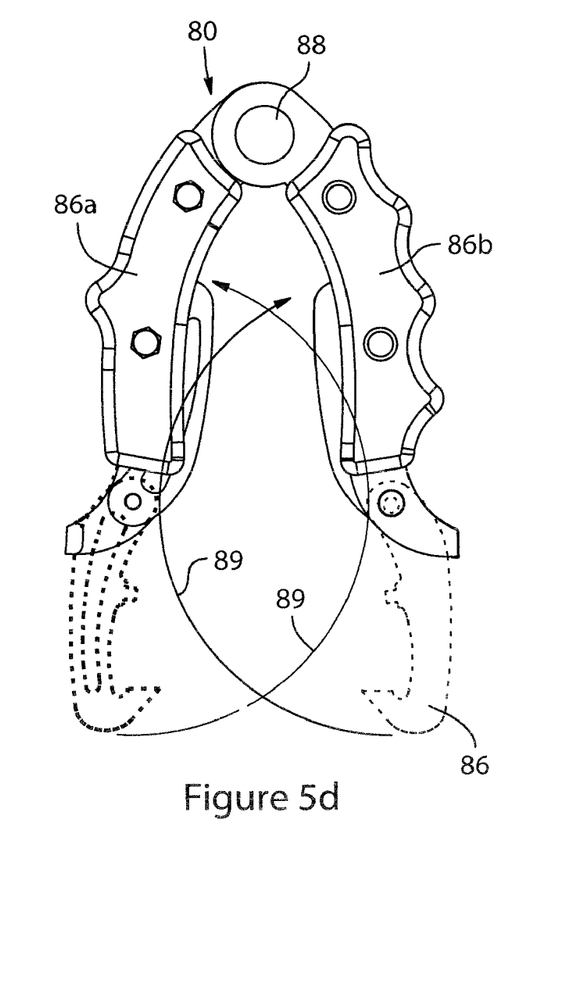
FIG. 5d is a front view of the slug removal tool of FIG. 5c.

Turning to FIGS. 5a and 5b, a perspective view and a front view, respectively, of a slug removal tool for use in the hole saw system is shown. The slug removal tool, or puller 80, includes an ergonomic handle portion 82 which is connected to a pair of leg portions 84 which are used to assist in the slug removal process. The handle portion 82 includes a pair of arm portions 86a and 86b which are connected via a pivot point 88 about which the arm portions 86 move. In one embodiment, the handle portion 82 is similar to a hand exercising machine. Attached in pivotal engagement to each arm portion 86 is one of the pair of leg portions 84 so that the leg portions 84 can be moved from an open, or in use, position (FIG. 5a) to a closed position (FIG. 5c). As schematically shown in FIG. 5d, the leg portions 84 pivot (in the direction of arrows 89) into a storage slot within the arm portions 86.

Figures 6A, 6B:
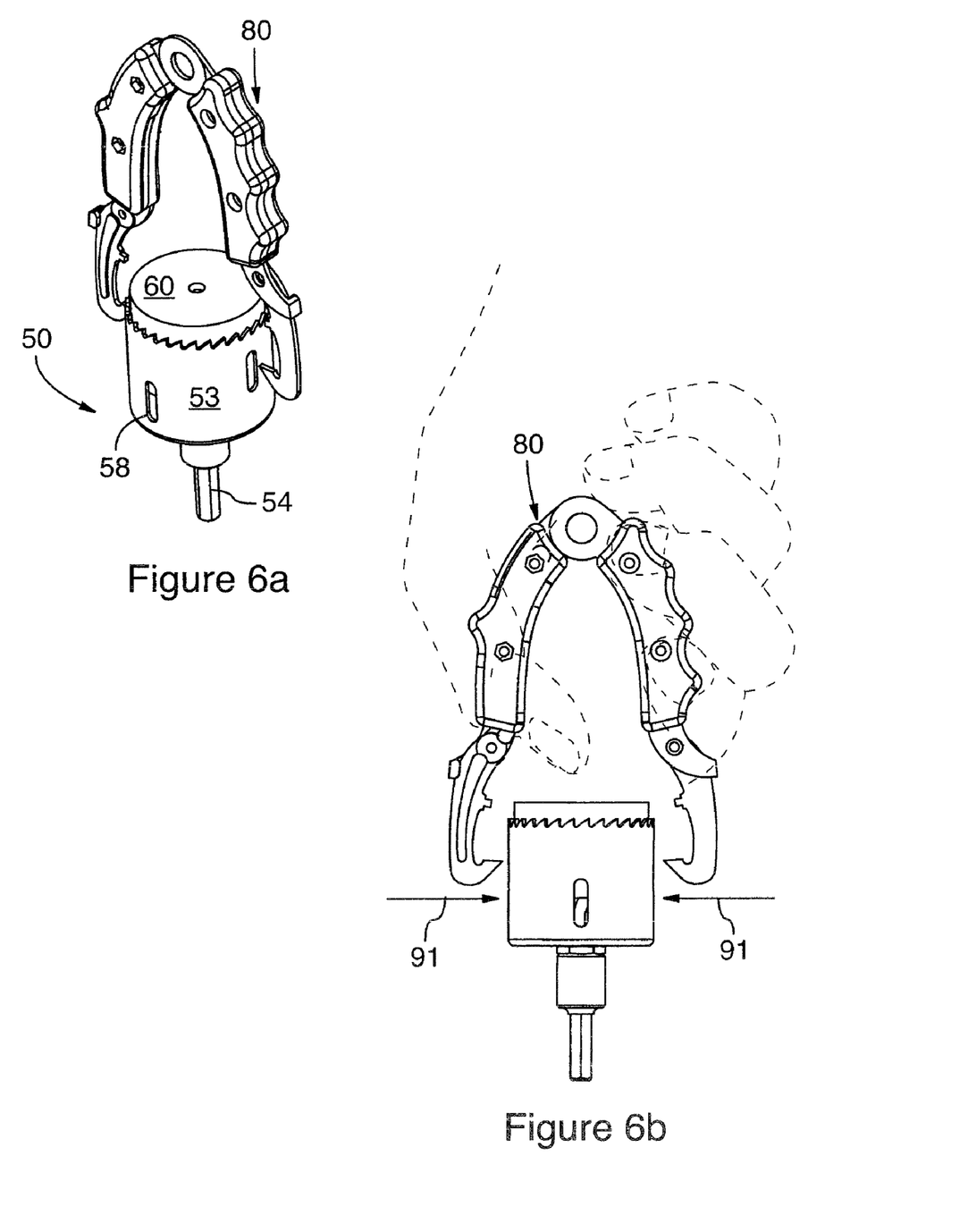
FIG. 6a is a perspective view of the hole saw system.
FIG. 6b is a front view of the hole saw system.
Figure 7A:
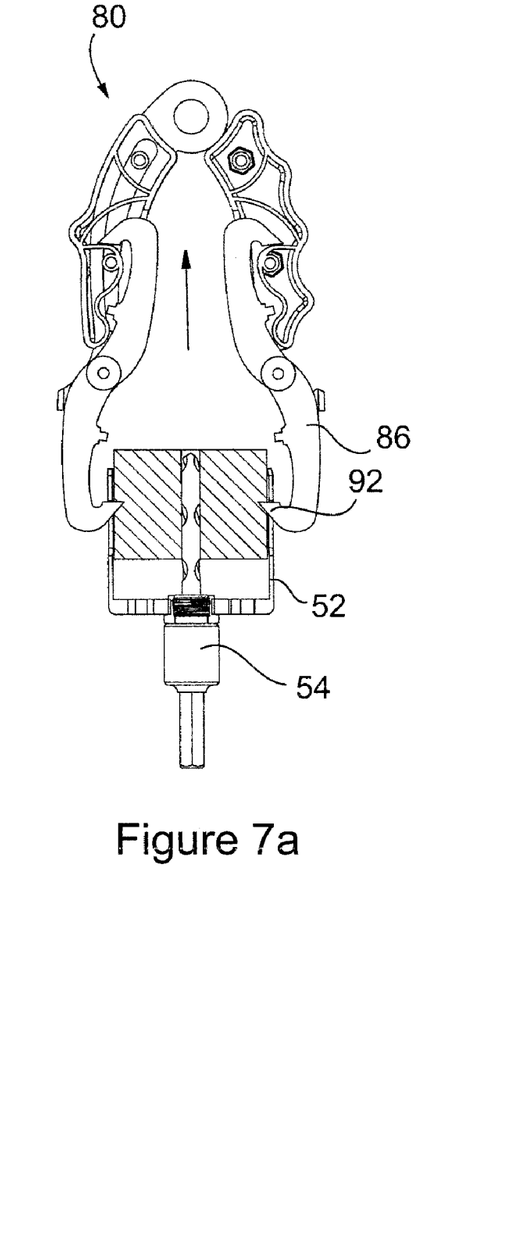
FIG. 7a is a cut away front view of the slug removal tool in a first use.
Figure 7B:
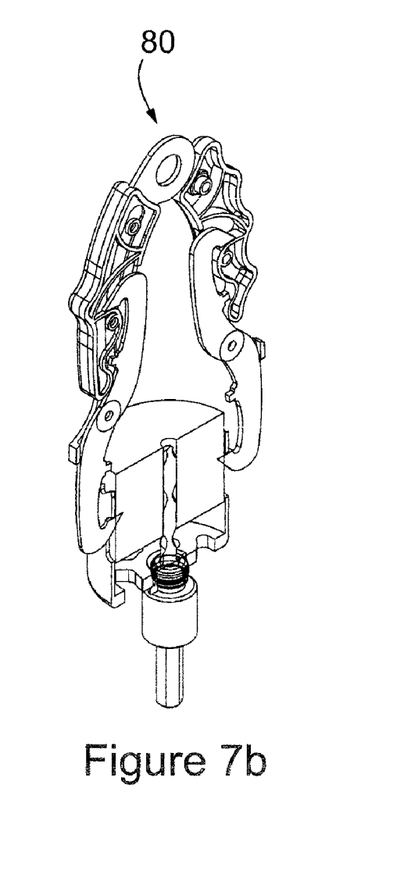

Each leg portion 84 includes a protrusion 90 which is used to mate with one of the slots 58, or holes, in the side of the hole saw 52 in order to loosen or tighten the hole saw 52 to the mandrel 54. At the end of each leg portion 84, away from the arm portions 86, is a sharpened inwardly directed prong, 92 which is used in the slug ejection, or removal, process. When a slug 60 is located within the hole saw, the prongs 92 are positioned adjacent a pair of diametrically opposed slots whereby the arm portions 86 of the slug puller 80 can then be squeezed to urge the prongs 92 into the slug (in the direction of arrows 91) in order to providing a toehold, or grip, before pulling the slug out of the hole saw. The positioning of the slug puller 80 is schematically shown in FIGS. 6a and 6b. The prongs 92 provide an improvement over current slug pullers which are used to push the slug out from a rearward position behind the slug rather than provide a gripped solution which allows the slug to be pulled. The slug puller 80 can also be used to push, or pry the slug out. In the current invention, the user can either grip and pull the slug (FIGS. 7a and 7b) or provide a rearward urging to pull the slot out (FIGS. 8a and 8b) or a combination of both to remove the slug.

Figure 8A:
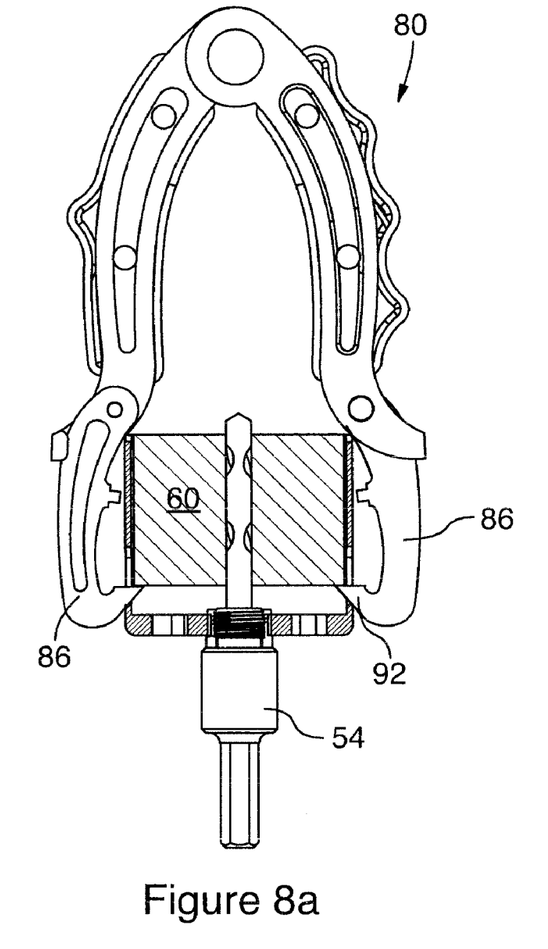
FIG. 8a is a cut away front view of the slug removal tool in a secondary use in a first position.
Figure 8B:
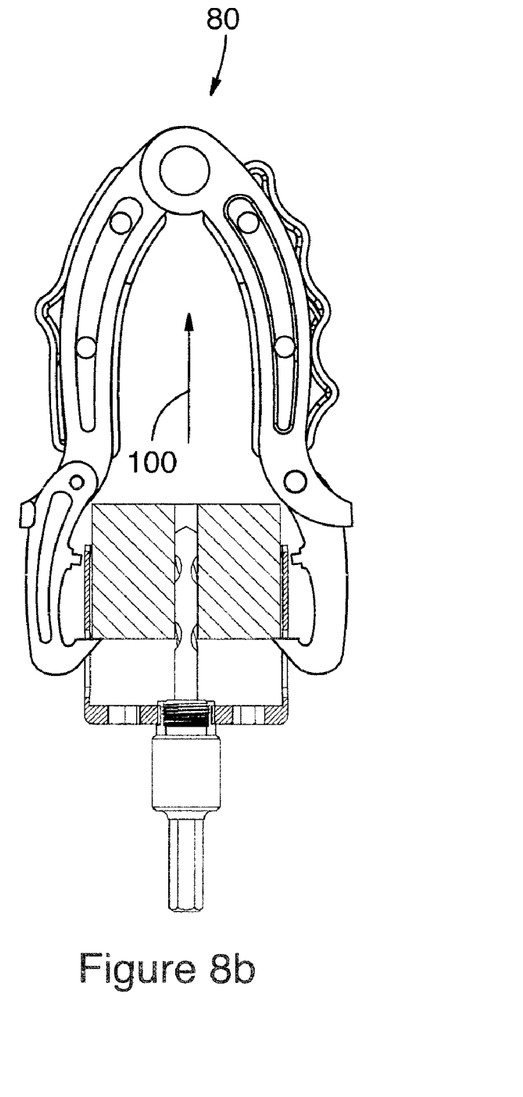
FIG. 8b is a cut away front view of the slug removal tool in a secondary use in a second position.

As shown in FIGS. 8a and 8b, after the user has inserted the slug puller into the slot pair, the prongs 92 are located under the slug 60 (FIG. 8a). The user can then pull the slug 60 out of the hole saw by moving the prongs along the slots (FIG. 8b) in the direction of arrow 100.

In operation, after the hole has been cut using the pilot bit with the extended flute section, the slug 60 can be more easily removed with the current hole saw system. By providing access to the slug over a longer longitudinal distance of the hole saw, such as by having the offset slots 58, the slug 60 can be removed at any point during the cutting process or cycle. As shown in FIG. 7a, 7b, 8a or 8b, after the hole is cut, the slug 60 can be accessed from either of the pairs of slots 58 using the slug puller 80 depending on the location of the slug. This is preferably achieved using the slug puller shown and disclosed above.

Once the prongs 92 are engaged with the slug, the slug can then be pulled out of the hole saw to provide an improved method of slug removal. As discussed above, the slug can also be pushed out via one of the slots in the bottom of the hole saw. Prior art slug removal tools only allow the slug to be accessed from a rearward position since they only allow for the slug to the pushed out.

In the preceding description, for purposes of explanation, numerous details are set forth in order to provide a thorough understanding of the embodiments of the invention. However, it will be apparent to one skilled in the art that these specific details are not required in order to practice the invention.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A hole saw system comprising:
   a hole saw including a bottom portion and a body portion, wherein the body portion includes at least one pair of opposing slots for receiving a slug puller to be inserted into the slots for removal of a slug; and
   a slug puller, wherein the slug puller comprises:
   a handle portion including a pair of arm portions connected in pivotal engagement with each other; and
   a pair of leg portions, each leg portion associated with a respective arm portion, each leg portion including a hook-shaped end portion for engaging the slug, and a protrusion for use in loosening or tightening the hole saw to a mandrel.

2. A hole saw system as in claim 1, wherein each said leg portion is pivotably mounted on said arm portion, so as to be foldable against said arm portion for more compact storage.

3. A hole saw system as in claim 2, wherein there are two pairs of said opposing slots, each slot being offset by 90 degrees from each other.

4. A hole saw system as in claim 3, wherein the bottom portion of said hole saw has a plurality of openings for weight reduction and particulate escape.

5. A hole saw system as in claim 2, wherein the bottom portion of said hole saw has a plurality of openings for weight reduction and particulate escape.

6. A hole saw system as in claim 1, wherein there are at least two pairs of said opposing slots, at least one said pair being displaced longitudinal relative to at least one other said pair, thereby providing access for said slug puller over a longer longitudinal distance than if said pairs were not displaced relative to each other.

7. A hole saw system as in claim 6, wherein the bottom portion of said hole saw has a plurality of openings for weight reduction and particulate escape.

8. A hole saw system as in claim 1, further comprising a mandrel, securable to said bottom portion of the hole saw.

9. A hole saw system as in claim 8, further comprising a pilot bit secured to said mandrel to extend into the hole saw along a central axis thereof and beyond a distal end of said hole saw.

10. A hole saw system as in claim 9, wherein the bottom portion of said hole saw has a plurality of openings for weight reduction and particulate escape.

11. A hole saw system as in claim 8, wherein the bottom portion of said hole saw has a plurality of openings for weight reduction and particulate escape.

12. A hole saw system as in claim 1, wherein the bottom portion of said hole saw has a plurality of openings for weight reduction and particulate escape.

* * * * *